US007715634B2

(12) United States Patent
Lei et al.

(10) Patent No.: US 7,715,634 B2
(45) Date of Patent: May 11, 2010

(54) METHOD FOR CLASSIFYING A SIGNAL

(75) Inventors: Zhichun Lei, Stuttgart (DE); Christian Unruh, Stuttgart (DE)

(73) Assignee: SONY Deutschland GmbH, Cologne (DE)

( * ) Notice: Subject to any disclaimer, the term of this patent is extended or adjusted under 35 U.S.C. 154(b) by 838 days.

(21) Appl. No.: 11/563,090

(22) Filed: Nov. 24, 2006

(65) Prior Publication Data

US 2007/0189610 A1 Aug. 16, 2007

(30) Foreign Application Priority Data

Feb. 15, 2006 (EP) .................................. 06003045

(51) Int. Cl.
*G06K 9/62* (2006.01)
*G06K 9/40* (2006.01)
*H04N 5/14* (2006.01)
*H04N 9/64* (2006.01)

(52) U.S. Cl. ........................ 382/224; 382/275; 348/571

(58) Field of Classification Search ................. 382/224, 382/275; 348/571
See application file for complete search history.

(56) References Cited

U.S. PATENT DOCUMENTS 5,606,619 A 2/1997 Chahabadi et al.
5,631,963 A 5/1997 Herrmann
6,397,050 B1 5/2002 Peterson et al.
6,728,391 B1 * 4/2004 Wu et al. .................... 382/101
2003/0076900 A1 4/2003 Magee et al.

FOREIGN PATENT DOCUMENTS

GB 2 414 646 A 11/2005

* cited by examiner

*Primary Examiner*—John B Strege
(74) *Attorney, Agent, or Firm*—Oblon, Spivak, McClelland, Maier & Neustadt, L.L.P.

(57) ABSTRACT

The present invention relates to a method for classifying a signal (S). An intermediate signal (IS) is decimated in order to obtain a processed signal (PS) as a new intermediate signal (IS). A processed signal (PS) is compared with respect to the signal (S) to be classified to thereby generate comparison data (CompDAT). Based on the comparison data (CompDAT) said signal (S) to be classified is classified, thereby classification data (ClassDAT) are generated.

19 Claims, 14 Drawing Sheets

METHOD FOR CLASSIFYING A SIGNAL

FIELD OF THE INVENTION

The present invention relates to a method for classifying a signal, and more particular to a concept for multi rate, multi scale or multi resolution based noise decimation and/or high frequency signal component area or component detection.

BACKGROUND OF THE INVENTION

Nowadays, the analysis and classification of signals becomes more and more important, in particular in electronic customer devices and respective equipment. Many methods and devices for pre-estimating and pre-processing signals have been developed in order to derive certain properties of the respective signals in order to classify these signals for further processing, or the like.

However, known methods and devices are comparable complicated in structure, architecture and its processing flow. Therefore, the respective computational burden and/or hardware equipment and to space and/or time-consuming systems.

SUMMARY OF THE INVENTION

It is therefore an object underlying the present invention to provide a method for classifying signals which can be implemented in an easy way and which inherently and by simple means is capable of unambiguously classifying signals with respect to different signal components or signal areas.

The object is achieved by a method for classifying signals according to independent claim 1. Preferred embodiments of the method for classifying signals according to the present invention are within the scope of the dependent sub-claims. The object is further achieved by a system or an apparatus according to independent claim 17, by a computer program product according to independent claim 18, and by a computer readable storage medium according to independent claim 19.

The invention in its broadest sense is based on a process of decimating an intermediate signal which is derived from a signal to be classified in order to thereby generate a processed signal. The intermediate signal or processed signal is then compared to the signal to be classified. Upon said comparison a classification of the signal to be classified is derived.

Therefore, the present invention provides a method for classifying signals which comprises processes of (a) providing/receiving a signal to be classified as an input signal, (b) using said input signal as an intermediate signal, (c) decimating said intermediate signal or a part or a plurality of parts thereof in order to thereby generate a processed signal or a processed part or a plurality of processed parts thereof, (d) comparing said intermediate signal or said part or said plurality of parts thereof with said signal to be classified or with said respective part or with respective plurality of parts thereof in order to thereby generate comparison data as a comparison result, (e) classifying said signal to be classified or said part or plurality of parts thereof based on said comparison data in order to thereby generate classification data as a classification result. This is in particular done in the order as given.

The apparatus, system and/or device for classifying a signal are adapted and comprise means in order to realize and perform the method for classifying a signal according to the present invention.

Additionally, according to the present invention a computer program product is provided which comprises a computer program means which is adapted in order to realize and perform a method for classifying a signal according to the present invention when it is executed or performed on a computer or a digital signal processing means.

Additionally, according to a further aspect of the present invention a computer readable storage means is provided which comprises a computer program product according to present invention.

These and further aspects of the present invention will be further discussed in the following:

BRIEF DESCRIPTION OF THE DRAWINGS

The invention will now be explained based on preferred embodiments thereof and by taking reference to the accompanying and schematical figures.

DETAILED DESCRIPTION OF THE INVENTION

Figure 1:
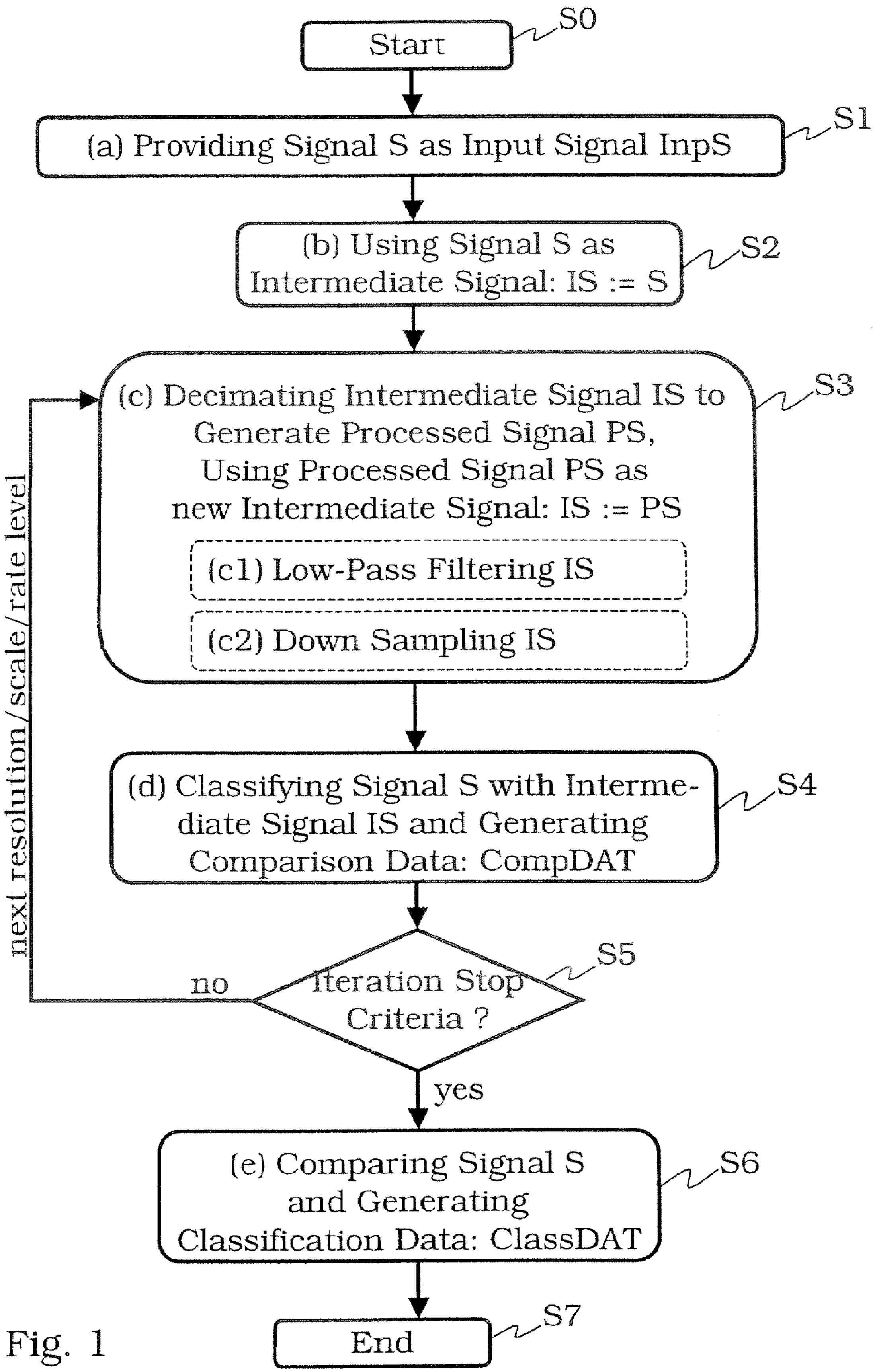
FIG. 1 is a schematical flow chart which elucidates some basic aspects of the present invention according to a preferred embodiment thereof.

In the following functional and structural similar or equivalent element structures will be denoted with the same reference symbols. Not in each case of their occurrence a detailed description will be repeated.

The method for classifying a signal may comprise processes of (a) providing/receiving a signal S to be classified as an input signal InpS, (b) of using said input signal InpS or a part or parts thereof as an intermediate signal IS or as a respective part or respective parts thereof, (c) of decimating said intermediate signal IS or a part or parts thereof and thereby generating a processed signal PS and using said processed signal PS as a new intermediate signal IS, (d) of comparing said intermediate signal IS or a part or parts thereof with said signal S to be classified or with a respective part or with respective parts thereof and thereby generating comparison data CompDAT as a comparison result, and (e) of classifying said signal S to be classified or said part or parts thereof based on said comparison data CompDAT and thereby generating classification data ClassDAT as a classification result, in particular in that given order.

Said process (c) of decimating said intermediate signal IS may be based on a multi rate signal processing, also called multi scale or multi resolution signal processing.

Said process (c) of decimating said intermediate signal IS may comprise sub-processes (c1) of low pass filtering and/or anti-alias filtering said intermediate signal IS and (c2) of down-sampling said intermediate signal IS, in particular in that given order.

Said process (c) of decimating said intermediate signal IS and in particular the respective sub-processes (c1), (c2) may be carried out in order to reduce high frequency components, noise components and/or respective variances thereof and in order to keep the useful signal components of said intermediate signal IS essentially unchanged or even larger or to reduce said useful components of said intermediate signal IS only by a comparable smaller amount or by a comparable small amount.

Said processes (d) of comparing and/or (e) of classifying may be based on a process of gradient estimation.

Said process (c) of decimation said intermediate signal IS and in particular the respective sub-process (c1) of low pass filtering and/or of anti-alias filtering may be based on a windowing process, in particular are based on a Hamming window.

Said processes (c) of decimating said intermediate signal IS, (d) of comparing said intermediate signal IS, and/or (e) of classifying said signal S are carried out to one or many levels of resolution, scale and or rate or iteratively, in particular until a certain iteration stop condition is fulfilled.

Said process (d) of comparing said intermediate signal IS with said signal S to be classified involves a comparison of respective noise levels, of levels of high frequency components and/or of respective variances thereof.

An iteration—and in particular a respective iteration stop condition—and/or the processes of (d) of comparing said intermediate signal IS with said signal S to be classified may be based on respective threshold values and/or on respective threshold conditions, in particular in a predefined manner.

Based on the comparison data CompDAT and/or as the classification data ClassDAT homogeneous areas or signal components may be detected and/or may be distinguished from other areas or signal components, in particular with respect to the content of noise and/or of high frequency components.

Said process (c) of decimating said intermediate signal IS and in particular the sub-process (c1) of low pass filtering and/or of anti-alias filtering said intermediate signal IS may be pre-estimated based on a transfer function H given by said low pass filter and/or by said anti-alias filter which is involved.

The respective transfer function H of the underlying filter may be used in order to define a variance tolerance range in order to decide whether an area or signal component of said signal S to be classified is dominated by high frequency signal components or noise.

An area or a signal component may be classified as being dominated by noise if a variance calculated from a decimated intermediate signal IS is within a variance range or variance tolerance range. Otherwise the area or signal component in question may be classified as being dominated by high frequency signal components.

Areas or signal components may be detected as being homogenous or may be distinguished as being homogeneous from other areas or signal components by a process of cascading.

A tolerance range may introduced into a noise reduction factor.

If an area or signal component consists of high frequency signal components only, its noise variance can be interpolated from noise variance values which are calculated from areas or signal components in the neighbourhood. In this case a warning message may be generated which states that for such a case a reliable noise variance estimation result is not possible.

The proposed method can be applied to a signal of the group which consists of 1-dimensional signals, 2-dimensional signals, 3-dimensional signals, e.g. acoustical signals, speech signals, images, sequences of images.

According to a further aspect of the present invention a system, an apparatus, or a device for classifying a signal are provided which are adapted and which comprise means for carrying out a method for classifying a signal according the present invention and the steps thereof.

According to a further aspect of the present invention a computer program product is provided comprising computer program means which is adapted in order to carry out the method for classifying a signal according to the present invention and the steps thereof when it is carried out on a computer or a digital signal processing means.

According to a still further aspect of the present invention a computer readable storage medium is provided comprising a computer program product according to the present invention.

These and further aspects of the present invention will be further discussed in the following:

The present invention in particular also relates to a concept of multi-rate based noise estimation and high frequency signal component area detection.

This invention inter alia also discloses a noise level estimation method that is based on multi-rate signal processing. It makes use of the fact that the noise is random so that after decimation consisting of an anti-alias filter and a down-sampler, the noise variance decreases. The decreasing factor is determined by the anti-alias filter, and thus can be computed in advance. On the other side, because the useful signal is correlated, after decimation its power will not be reduced by the same factor as noise variance does. As result, the homogeneous noisy areas can be distinguished from those areas containing high frequency signal components. The noise level will then be estimated in homogeneous noisy areas, and one can obtain a reliable noise level estimation result.

The disclosed noise estimation method can not only provide a reliable noise estimation result for whole the available data, but also for different areas of the available data.

Noise level estimation has been done since long time. Numerous noise estimation methods have been developed. These methods could be classified into three categories: reference-directed, least-value-based, object-based and spectrum domain noise estimation.

Reference directed noise estimation method requires a reference signal or a priori knowledge about the signal. By comparing the reference and the noise disturbed signal, one can estimate the noise variance. An example of this category is the TV noise estimation by means of the known signals in the vertical blanking interval of TV signal system [Hent98], namely the synchronizing signals. Its disadvantage is that the synchronizing signals do not necessarily undergo the same noisy channel as the video signals do. Still worse, even such reference signal is also not available in all of the cases, for example the signals of storing media usually do not contain such synchronizing signals.

Least-value-based noise estimation method assumes that the distribution of the noise to be estimated is already known, for instance, Gaussian, Poisson distribution [Hent98]. Using the available data, the noise variance is calculated by making use of the fact that the noise variances calculated in homogeneous areas will be smaller than those calculated in areas with high frequency signal components. Thus, one can select the least N results among those calculation results as the noise variance. However, the question how to determine the "N" remains unsolved. The complexity of the least-value based noise estimation method is dependent upon the noise distribution. Estimating Poisson-distributed noise, whose variance is proportional to the signal intensity, will cause higher complexity than estimating Gaussian-distributed noise, whose variance can be considered as independent of the signal intensity. If the data for noise estimation are composed of those from different sources, e.g. a noisy signal is inserted by a high quality CD signal, or a multimedia image consisting of a part of picture taken by camcorder/camera and a part of high quality picture generated in studio, the noise variances are normally different. As result, this kind of least value based noise estimation method can fail. Besides, the method also depends on the image content even if the assumed model is exact. If the available data are only of high frequency signal components, the least N results do not agree with the true noise variance value.

Object based noise estimation utilizes the knowledge about the objects detected in advance. This method would work well if the patterns could be reliably recognized. Unfortunately, pattern recognition is an ill-posed problem and itself requires a reliable noise variance estimation result.

Spectrum domain noise estimation method estimates noise level in signal spectral domain. Besides its high computational load of this kind of method, its estimation result is dependent upon the characteristics of available data. It will give a wrong result if the available signal data consists of only high frequency signal components. This kind of noise estimation method cannot deal with mixed signals from different sources. Besides, it cannot directly detect homogeneous areas from areas containing high frequency signal components. The homogeneous area detection is of importance for a lot of signal processing operations.

Besides, [Olsen93] gives an evaluation of different noise estimation methods.

This invention inter alia firstly aims at providing a method for reliable noise level estimation. Secondly, it allows the homogeneous areas to be directly detected from the areas dominated by high frequency signal components.

Some of the state-of-the-art noise level estimation methods require a priori knowledge about the available data, but the priori knowledge can be unreliable, and is not always available. Other state-of-the-art noise level estimation methods cannot deal with mixed signals from different sources, and provide wrong noise level estimation result for the available data that are only of high frequency signal components.

It is well-known that the low pass filter can reduce noise variance. The reducing amount is strongly related to the low pass filter used. However, the decimation will not reduce the signal power in the same amount, although low pass filter will reduce the signal high frequency components. This is because the down-sampling operation will tend to increase the signal power spectrum, and counteract the low pass filter role that reduces the signal high frequency components. Although noise also undergoes the same down-sampling operation, the down-sampling reduces the available data number for noise variance calculation, and thus affects the exactness of the estimated noise variance, but will not increase the noise variance. We will also discuss how to counteract this kind of affect. For comparison purpose, the term of "signal power" in the following will be replaced by "signal variance".

In the following, detailed reference is taken to the Figs.:

FIG. 1 is a schematical block diagram or flow chart which elucidates a preferred embodiment of the method for classifying a signal and therefore some basic aspects of the present invention.

After a starting or initialization step S0 a first step S1 is performed which is adapted in order to realize the process (a) for providing and/or for receiving a signal S to be classified.

In the following step S2 a process (b) is performed wherein said signal S to be classified, i.e. an input signal InpS, is set as an intermediate signal IS. In the following step S3 a process (c) of decimating said intermediate signal IS is performed in order to thereby generate a processed signal PS. The processed signal PS is used and therefore set as a new intermediate signal IS. The third step S3 and therefore the process (c) for decimating said intermediate signal IS is sub-divided into a first sub-process (c1) of low pass filtering and/or of anti-alias filtering and into a second sub-process (c2) of down-sampling said intermediate signal IS.

In a further step S4 the process (d) of comparing the respective intermediate signal IS with said signal S to be classified is performed in order to thereby generate comparison data CompDAT as a comparison result. Such a comparison may involve a statistical analysis of the intermediate signal IS as well as of the input signal InpS of the signal S to be classified.

In a following step S5 it may be checked on whether or not certain iteration criteria are fulfilled in which case the whole method is finalized by performing a sixth step S6 comprising a process (e) of classifying the signal S to be classified based on the comparison data CompDAT in order to thereby generate classification data ClassDAT as a comparison result and to complete the whole process sequence with a finalizing end step S7. If certain iteration criteria are not fulfilled, a further iteration is performed by again executing steps S3 and S4 with a new intermediate signal IS.

Figure 2:
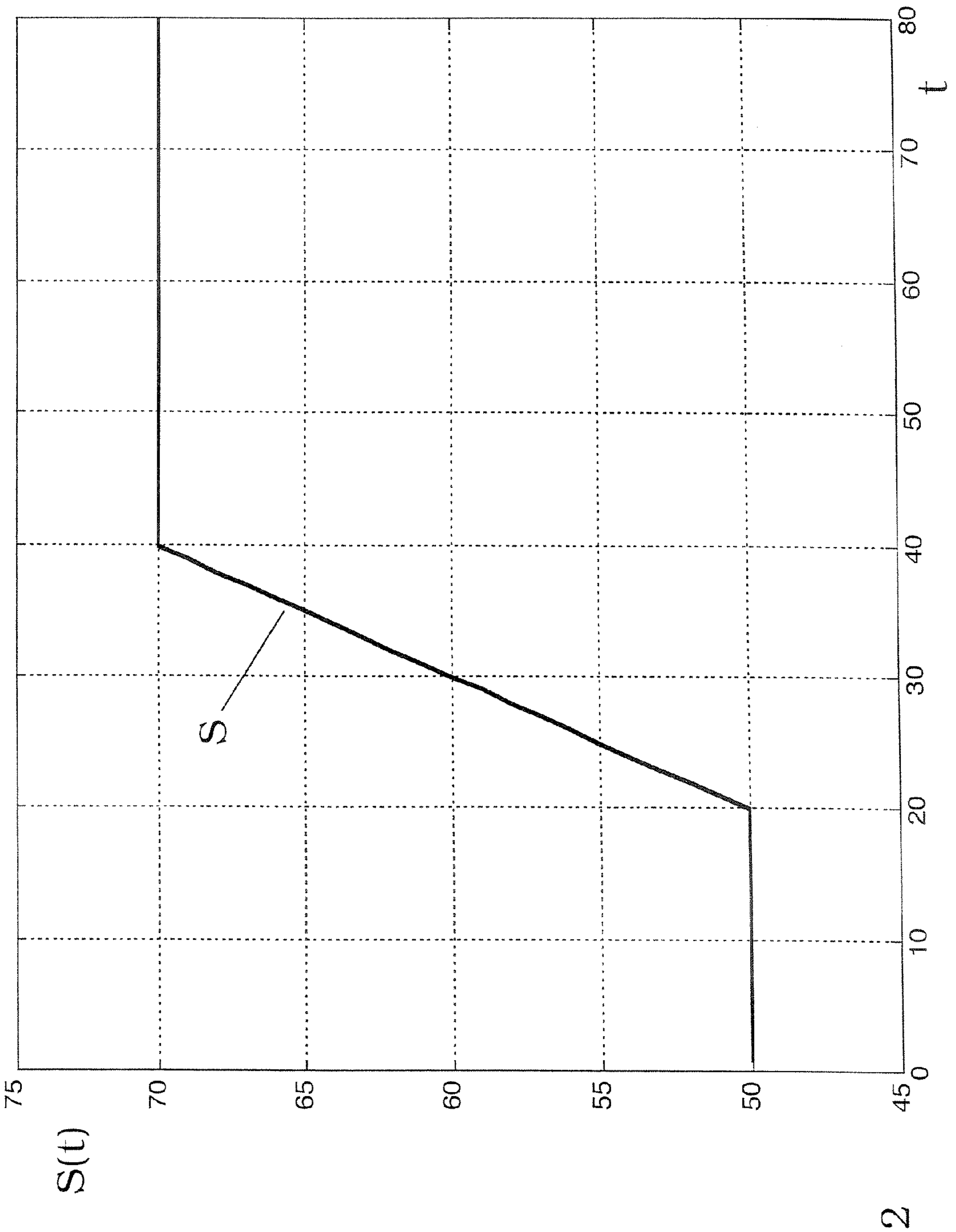
FIG. 2 is a graphical representation of an original signal to be classified with an edge and homogeneous areas or signal components.
Figure 3:
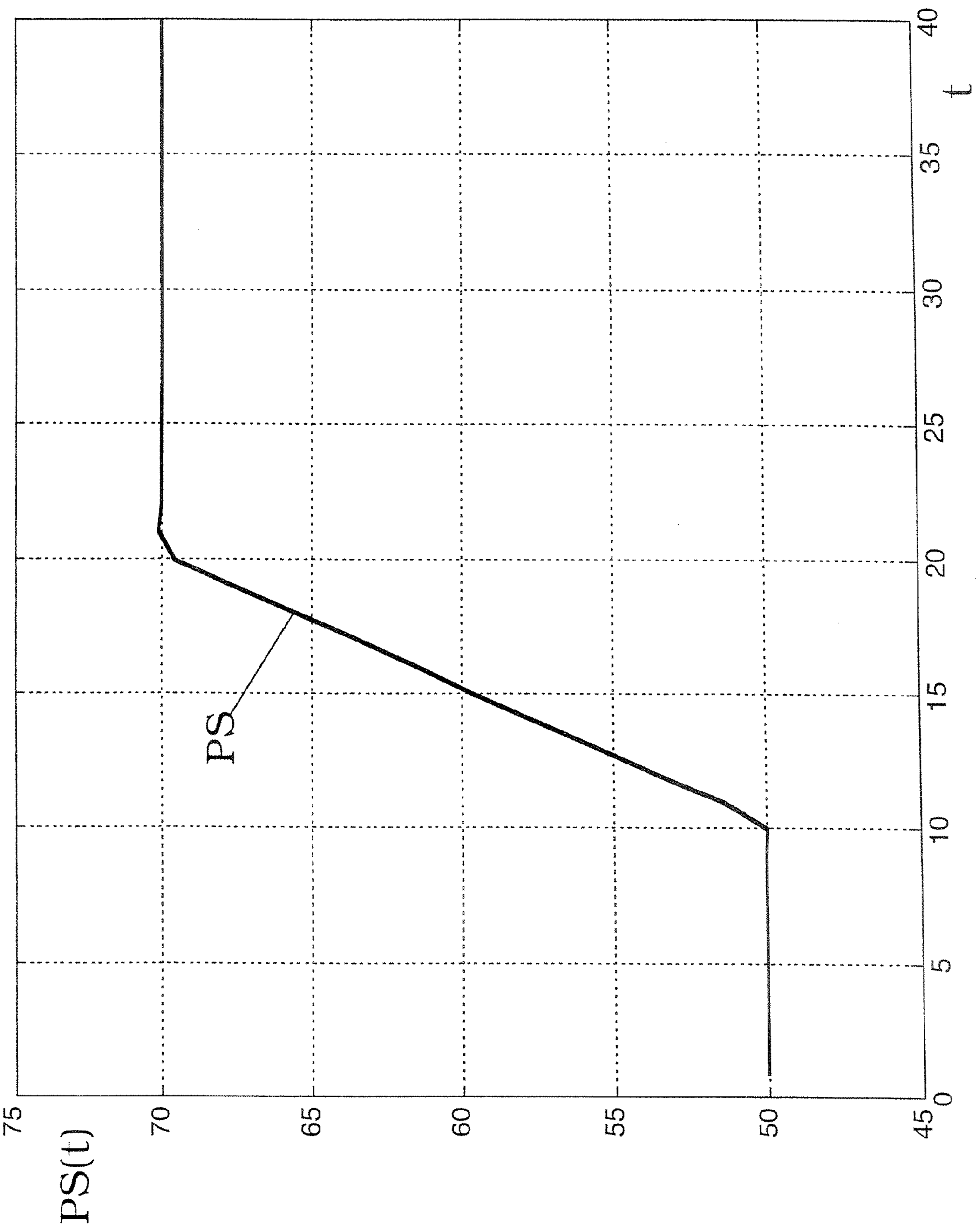
FIG. 3 is a schematical graphical representation of a processed signal which is derived from the signal of FIG. 2 by filtering and down-sampling by a factor of two.

As an example, FIG. 2 shows a signal with an edge and two homogeneous areas. For better illustration, at first no noise is simulated and in total 80 samples are plotted. In practice, there are of course noise and much more data available. Its decimated one by a factor of two is shown in FIG. 3. Because of down-sampling by a factor of two, the horizontal index of FIG. 3 is half of that plotted in FIG. 2, e.g. the position 15 in FIG. 3 corresponds to 30 in FIG. 2, and so on.

Figure 4:
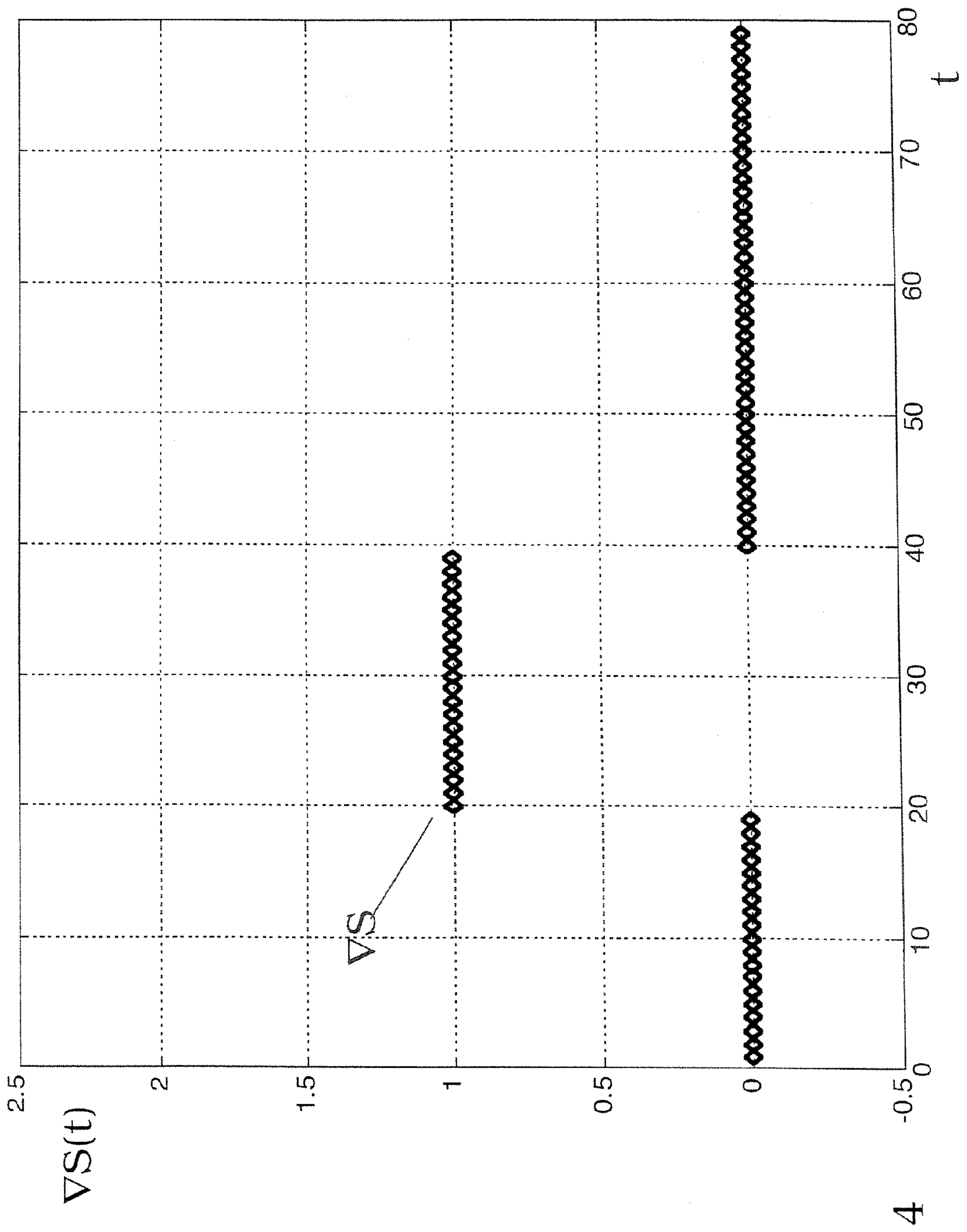
FIG. 4 is a schematical graphical representation of a gradient which is derived from a signal shown in FIG. 2.
Figure 5:
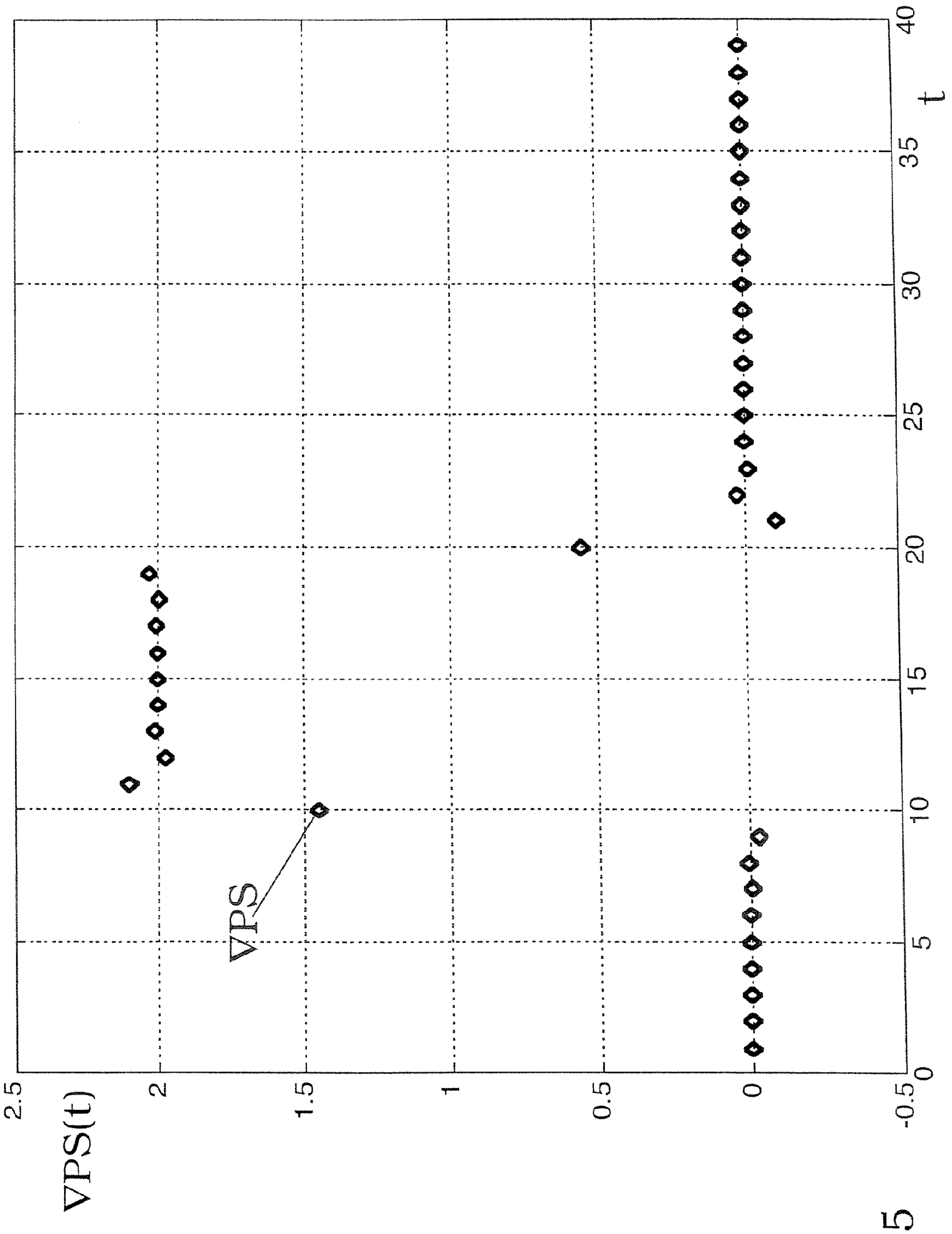
FIG. 5 is a schematical graphical representation of a gradient which is derived from the signal shown in FIG. 3.

FIGS. 4 and 5 respectively gives the calculated gradients of the original and the decimated signal. Comparing FIGS. 4 and 5, one can see that the decimation significantly increases the signal gradients, which in turn means the amplification of high frequency signal components.

Figure 6:
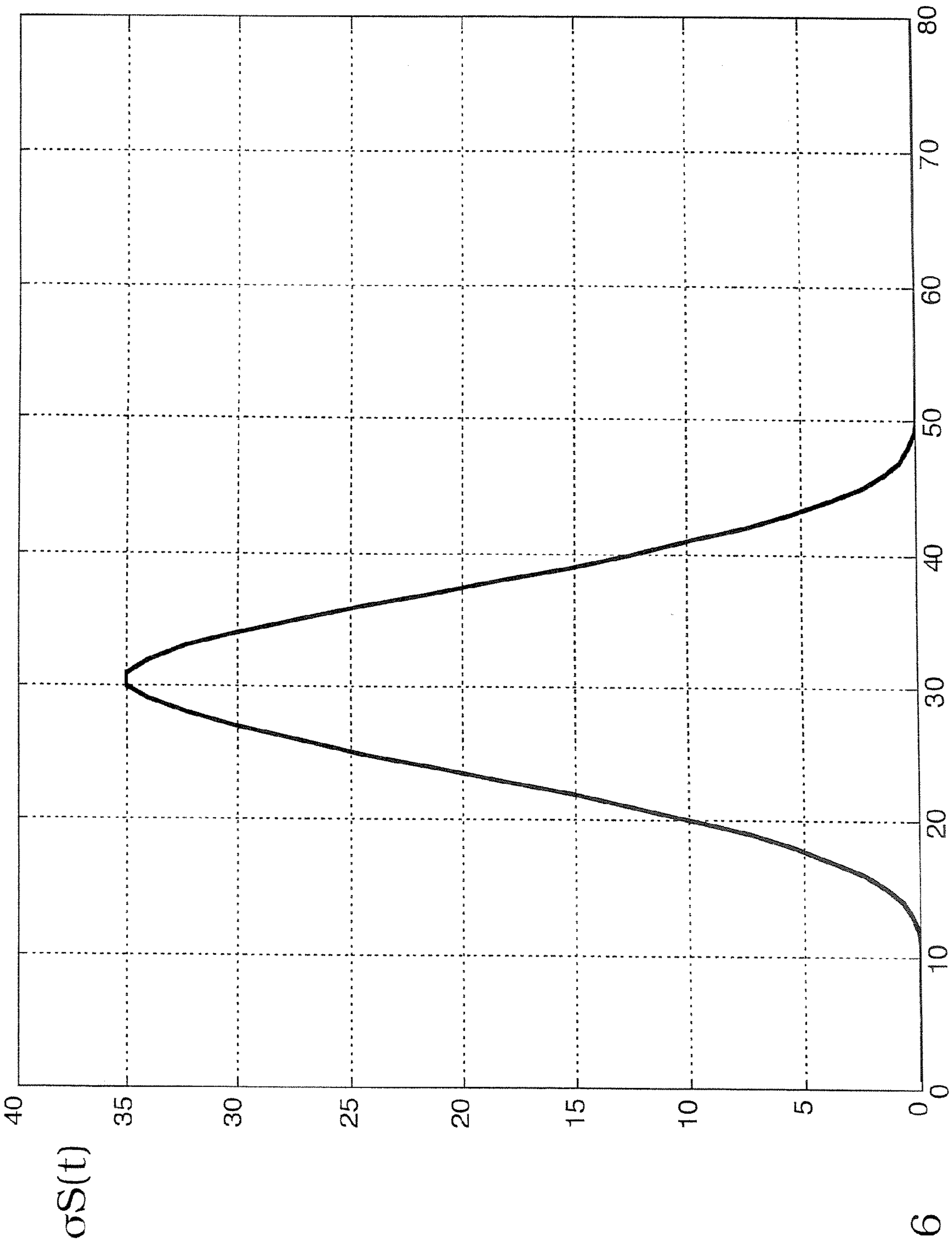
FIG. 6 is a schematical graphical representation of the variance of the signal shown in FIG. 2 calculated on the basis of a window length of 20.
Figure 7:
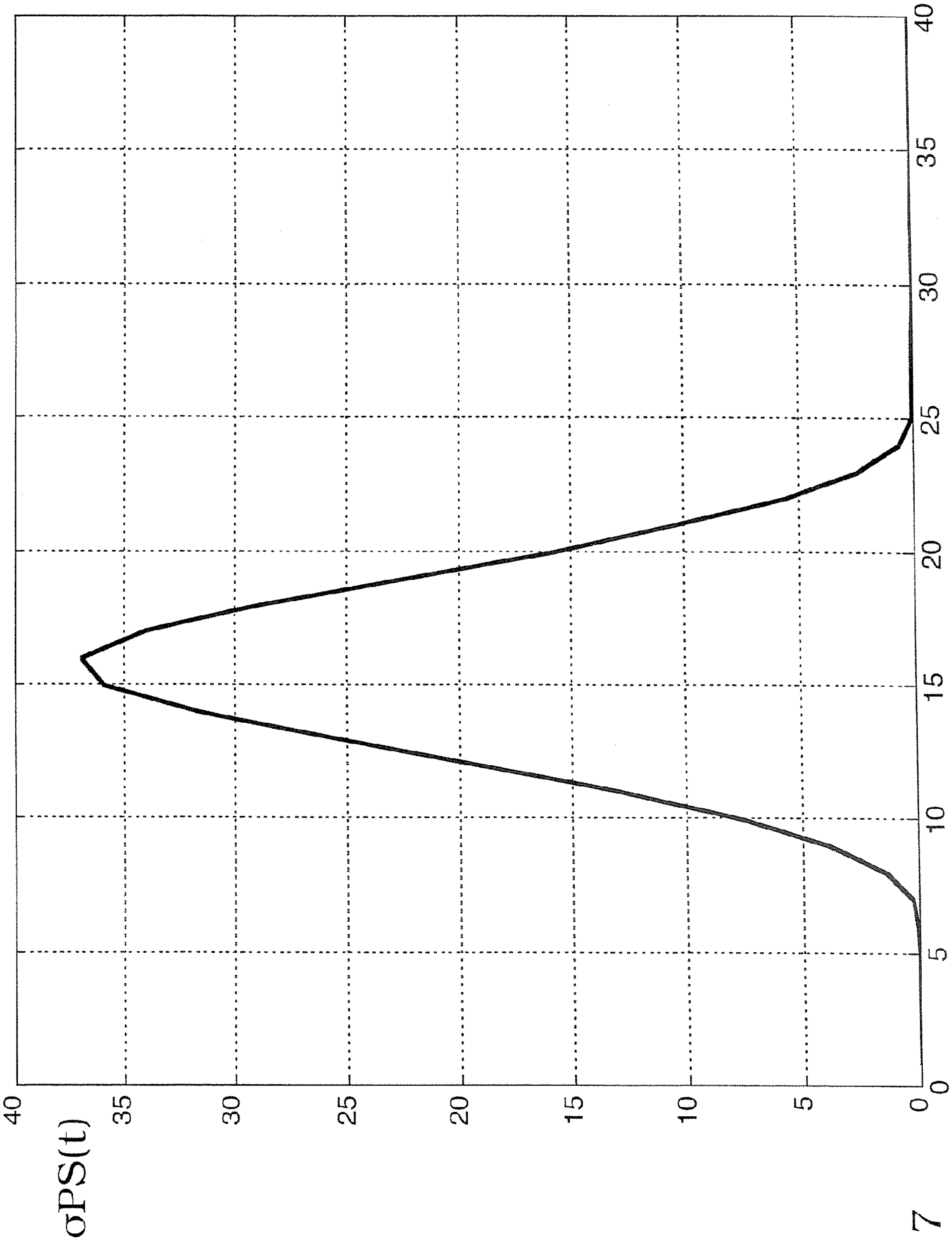
FIG. 7 is a schematical graphical representation which shows the variance calculated for the signal shown in FIG. 3 on the basis of a window length of 10.

FIGS. 6 and 7 respectively give the calculated variance value of FIGS. 2 and 3. In signal border areas, the variance is set to zero. For data with 80 samples, we set the window length as 20 for the variance calculation of original signal, whereas it is set as 10 for the one down-sampled by a factor of two.

As mentioned above, the low pass filter will reduce the noise variance. Lots of text books have taught the method for calculating the reducing factor, and it is $|H(ej\omega)|^2$, where $H(e^{j\omega})$ is the transfer function of the filter in question, e.g. of an anti-alias filter. Thus, the calculation of noise variance reduction factor is simple and this factor is fixed for a selected low pass filter. For instance, $|H(e^{j\omega})|^2$ of a 14th-order anti-alias filter designed by Hamming window amounts to 0.4478. In fact, this calculation result has more than four decimal places, the other decimal places are here omitted. Of course, this omitting will cause calculation error. To solve this problem, a tolerance range will be introduced into $|H(e^{j\omega})|^2$.

Figure 8:
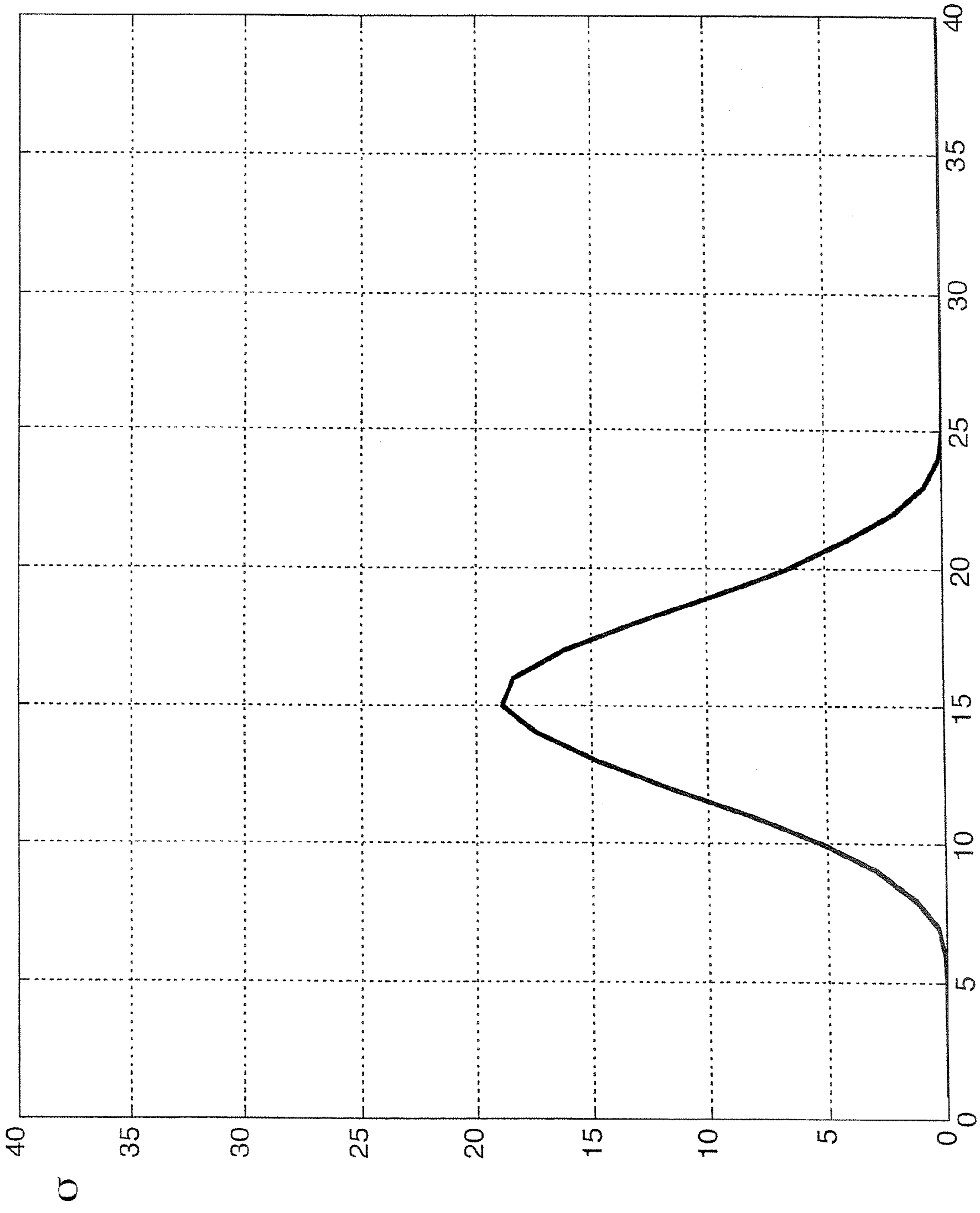
FIG. 8 is a schematical graphical representation which elucidates the variance calculated from the signal shown in FIG. 6, i.e. by multiplying FIG. 5 by a reducing factor caused by a respective anti-alias filter.

If one uses this calculated reducing factor to compute the signal variance of decimated signal, i.e. multiplying FIG. 6 by this reducing factor, one obtains the result shown in FIG. 8. If one directly calculates the variance from the decimated signal, one obtains the result shown in FIG. 7. The difference between FIGS. 7 and 8 is obvious. In edge area, the calculated signal variance (cf. FIG. 7) is significantly larger than the variance calculated by multiplying the variance of original signal by the reducing factor caused by the anti-alias filter (cf. FIG. 8). Thus, the decimation indeed does not reduce the signal variance by the same amount as the noise variance. This fact is therefore used to distinguish signal homogeneous areas from areas with high frequency signal components.

The decimated signal has less samples than the original one. For the case of decimation by two, the number of samples of the decimated signal is only one half of that of the original signal. The more the decimation, the less the data samples are available. Thus, the window length for variance calculation is also "decimated" by the same decimation factor. The less the available data samples, the poorer the accuracy of the estimated variance, in particular noise variance. To solve this problem, a tolerance range, for example $|\Delta|=20\%$, is introduced into the noise variance reduction factor, which equals to $|H(e^{j\omega})|^2$. Of course, this tolerance range aims also at dealing with the calculation error caused by the noise variance reduction factor as already mentioned. Another purpose of introducing tolerance range will be discussed later.

Figure 9:
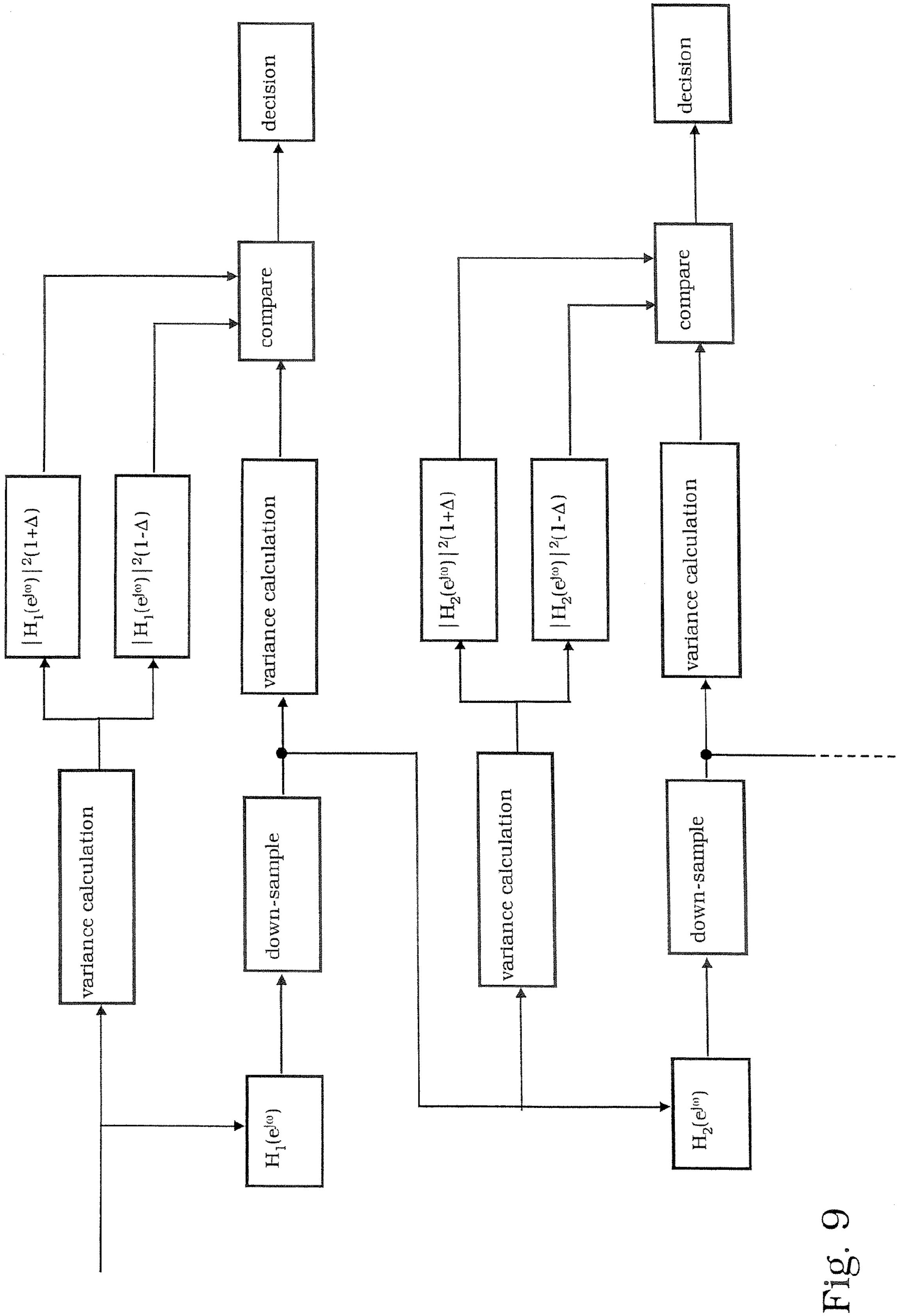
FIG. 9 is a schematical block diagram for an embodiment of the inventive method for classifying a signal and for a respective system.

FIG. 9 shows the method to determine whether an area is dominated by high frequency signal components or by noise, and of course also for noise variance estimation. FIG. 9 shows the cascading of decimation processing. It is determined by the noise disturbance situation how large the decimation factor is. According to our investigation result, for usual noisy signal, decimation by a factor of two is enough to be able to make the decision whether an area in question is dominated by noise or by high frequency signal components. However, if the S/N is very low, cascading the decimation is needed so that a relative easy decision can be made whether an area in question is dominated by noise or by high frequency signal components. According to our investigation result, it is also found that for detecting low frequency signal components cascading the decimation is also needed.

Figure 10:
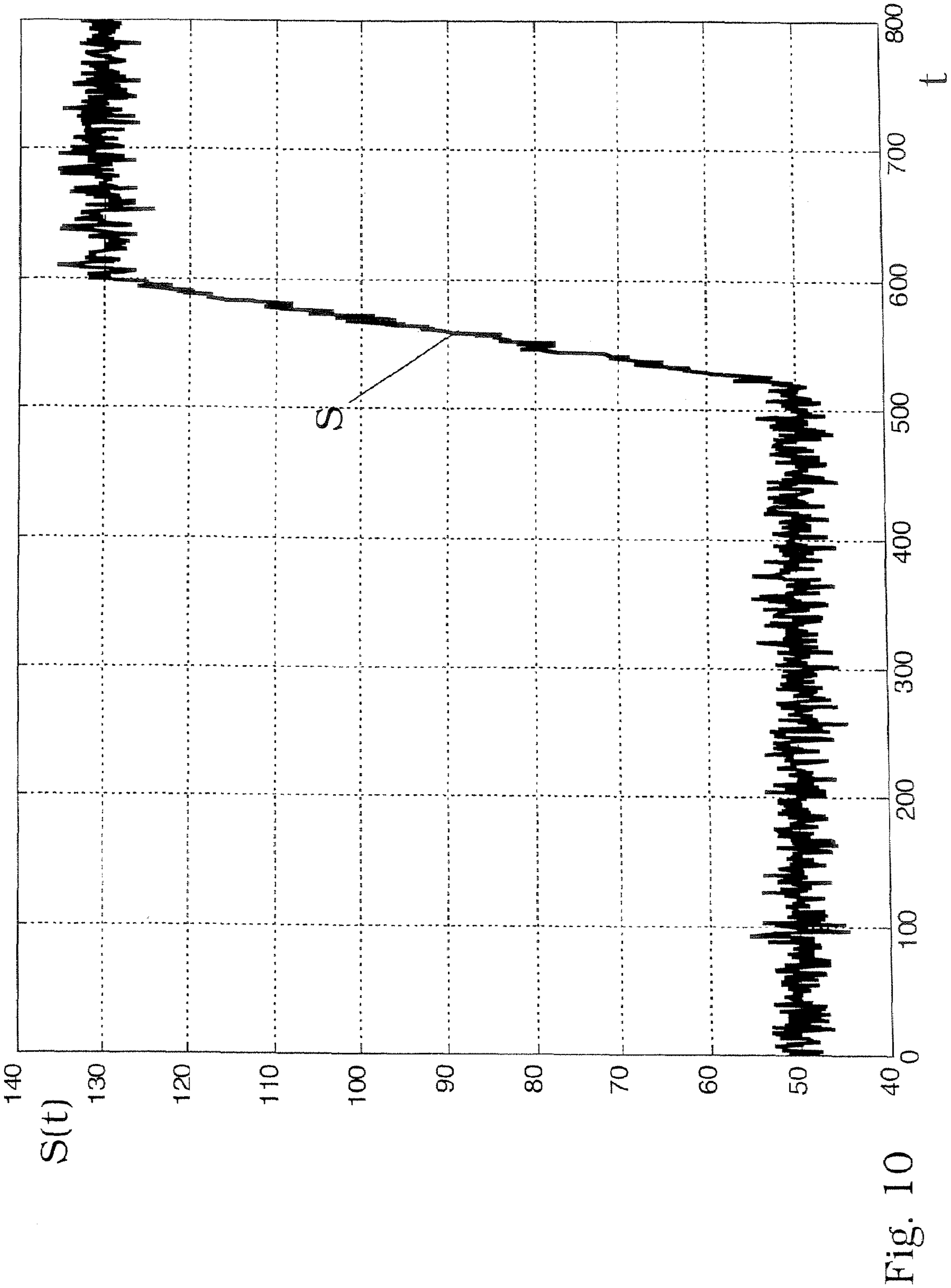
FIG. 10 is a schematical graphical representation of a signal to be classified comprising an edge and two homogeneous areas or signal components.
Figure 11:
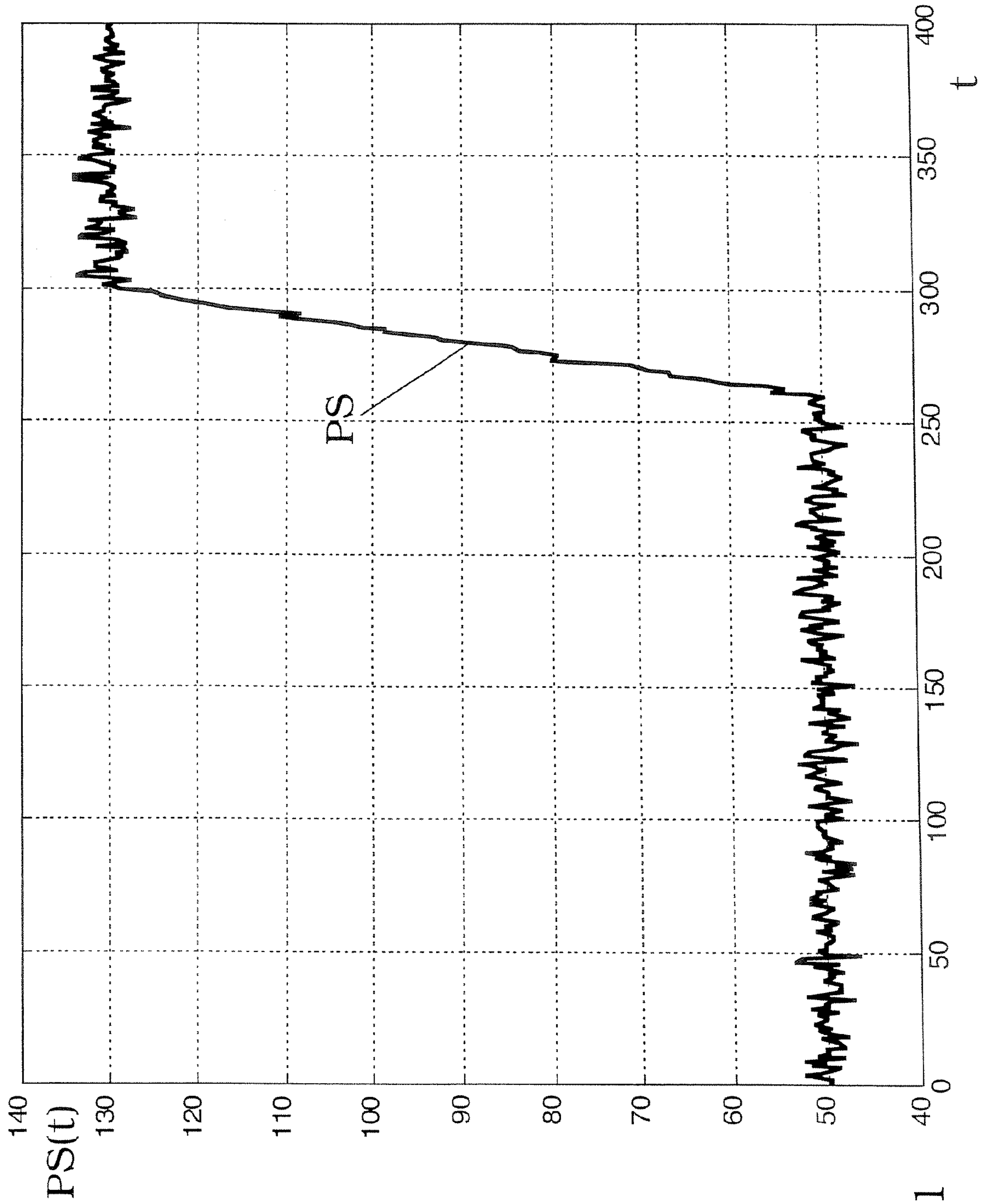
FIG. 11 is a schematical graphical representation of a signal which is obtained from the signal of FIG. 10 by filtering and down-sampling by a factor of two.
Figure 12:
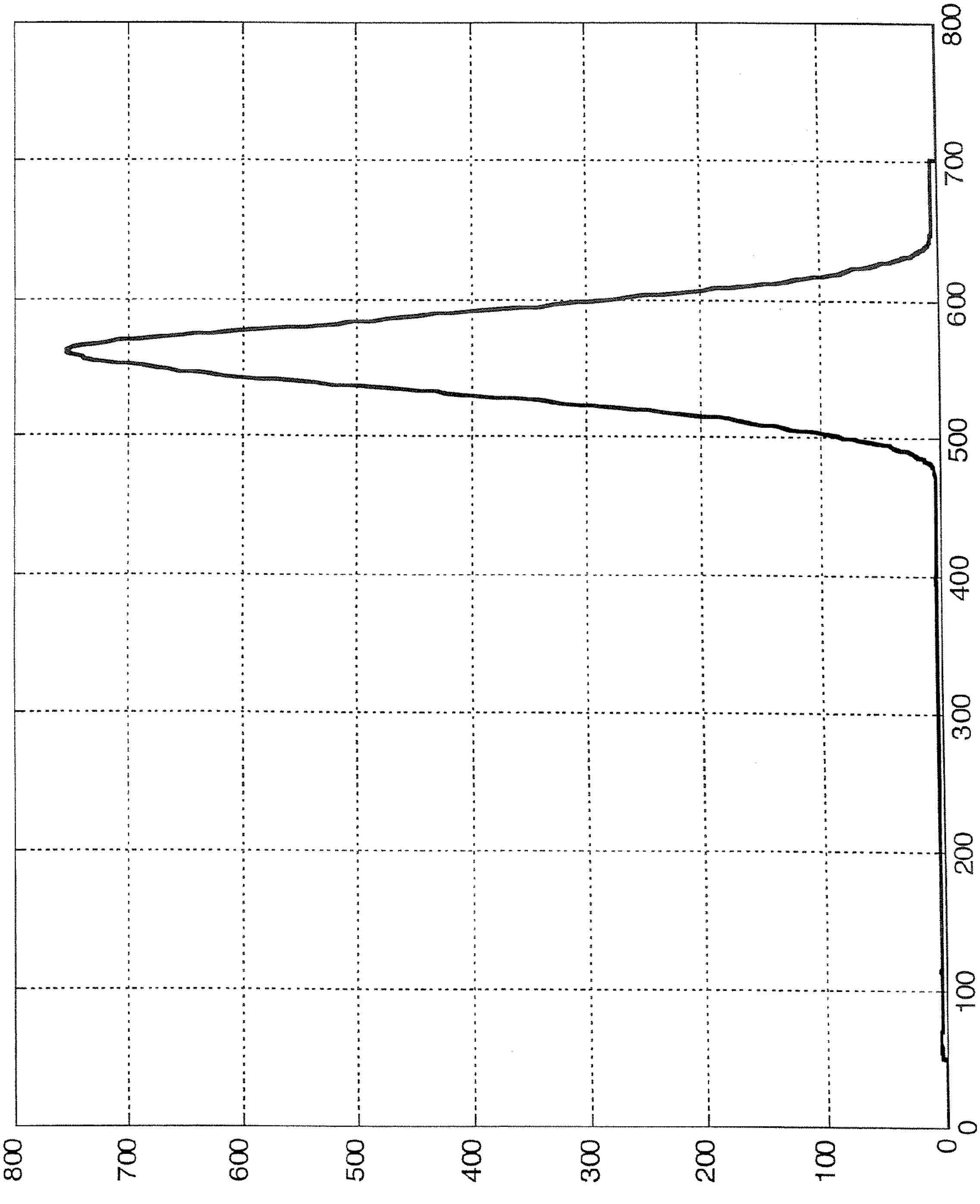
FIG. 12 is a schematical graphical representation which shows the variance calculated form the signal shown in FIG. 10 based on a window length of 100.
Figure 13:
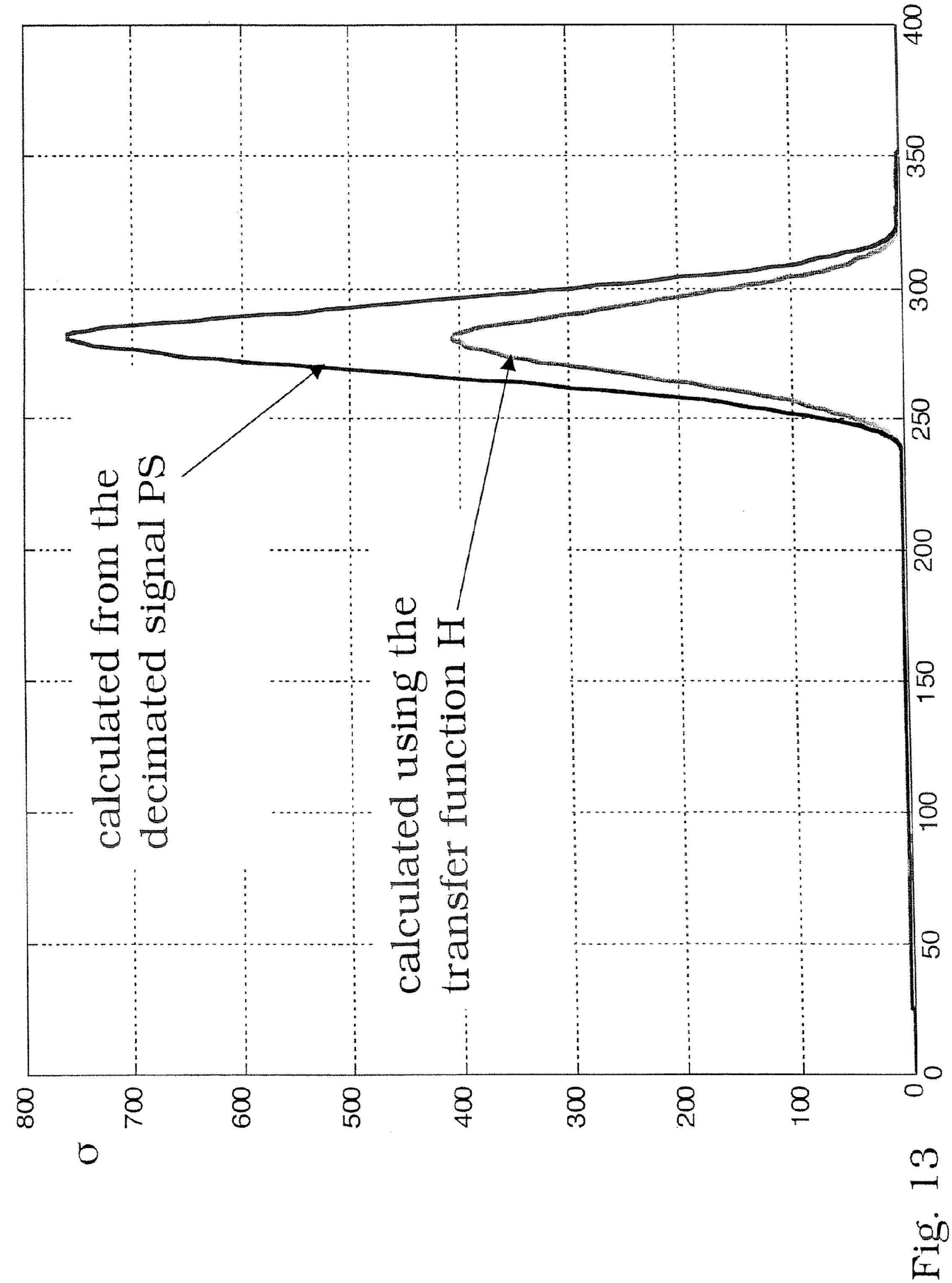
FIG. 13 is a schematical graphical representation elucidating the variances calculated from a decimated signal and using a transfer function of an underlying anti-alias filter based on a window length of 50.

Using the method disclosed above, noisy signal is also processed. An example for noisy signal with relative more samples is given in FIG. 10. FIG. 10 shows a noisy signal with 800 samples. Its decimated version is given in FIG. 11. FIG. 12 shows the calculated variance of FIG. 10. The variance calculated from FIG. 11 is shown in FIG. 13. In FIG. 13, the variance calculated using $|H(E^{j\omega})|^2$ is also given, where only the curve computed using the $(1+20\%)\times|H(e^{j\omega})|^2$ is shown. For all cases, in border areas, the variance is set to zero.

Figure 14:
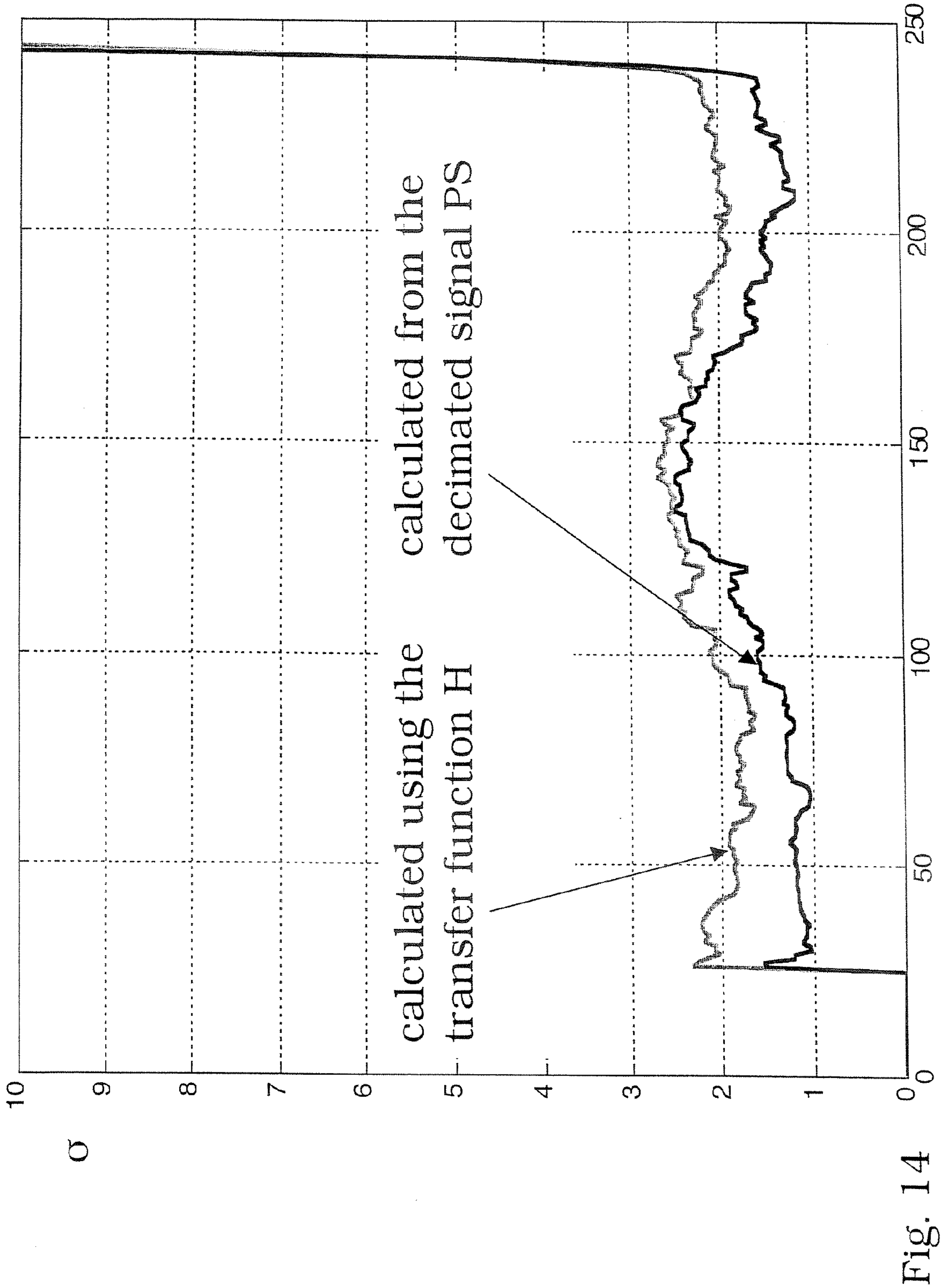
FIG. 14 is a schematical graphical representation elucidating details of the representation shown in FIG. 13, i.e. a slice of the representation of FIG. 13.

From FIG. 13 one can clearly see that in the edge area the variance calculated from the decimated signal is larger than that computed using the $(1+|\Delta|)\times|H(e^{j\omega})|^2$, with $|\Delta|=20\%$. This helps us to detect areas with high frequency signal components. To check the area dominated by noise, a slice of FIG. 13 is taken, and shown in FIG. 14. Contrary to area dominated by high frequency signal components, in area dominated by noise the variance calculated from the decimated signal is smaller than that computed using the $(1+|\Delta|)\times H(e^{j\omega})|^2$. $(1+|\Delta|)\times|H(e^{j\omega})|^2$ will result in the upper limit of the tolerance range. A lower limit of the tolerance range, resulted by $(1-|\Delta|)\times|H(e^{j\omega})|^2$, is also needed. The lower limit is important for the case of noise-free signal, of mixed signal whose noise variance value is usually different in different position. This example also proves the criterion to decide whether an area is dominated by high frequency signal components or noise, namely if variance calculated from the decimated signal is beyond the variance tolerance range, which is computed using $(1-|\Delta|)\times|H(e^{j\omega})|^2$ and $(1+|\Delta|)\times|H(e^{j\omega})|^2$, the area in question is detected as area dominated by high frequency signal components. If variance calculated from the decimated signal is within the variance tolerance range, which is computed using $(1-|\Delta|)\times|H(e^{j\omega})|^2$ and $(1+|\Delta|)\times|H(e^{j\omega})|^2$, the area in question is detected as area dominated by noise.

If the area in question consists of only high frequency signal components, its noise variance can be interpolated from those noise variance values calculated from its neighbouring areas, or output a warning message that no reliable noise variance estimation result is possible.

Again regarding the tolerance range $\Delta$: If $\Delta$ is set to zero, the area with high frequency signal components can also be reliable detected. However, this can affect the homogeneous area detection, namely a homogeneous area can be wrongly detected as non-homogeneous area.

Above, we only discussed one-dimensional signal. For the variance calculation in case of more dimensional signal, e.g. a two dimensional block, its principle is the same. Care shall be taken that the decimation processing should be done both in horizontal and vertical direction in case of a two dimensional block.

This method works in time/spatial domain, thus its computational load remains relative low.

This invention therefore in particular and inter alia relates to the following aspects:

1. A method in order to detect homogeneous areas or distinguish homogeneous areas from other areas.

2. In such a method the available data are decimated, which consists of a low pass filter and a down-sampler, and the noise variance calculated from the decimated signal is reduced compared to that calculated from the original data, but the signal variance will not be reduced or will not be reduced as much as the noise variance does.

3. In such a method the noise variance reduction factor caused by the decimation is at first computed by means of the transfer function of the low pass filter, and this factor is made use of to define a variance tolerance range to decide whether an area is dominated by high frequency signal components or noise, namely: if variance calculated from the decimated signal is within the variance tolerance range, the area in question is detected as area dominated by noise; otherwise, the area in question is detected as area dominated by high frequency signal components.

4. In such a method to detect homogeneous areas or distinguish homogeneous areas from other areas cascading of the processing method of items 1 to 3 may be employed.

5. Such a method to detect homogeneous areas or distinguish homogeneous areas from other areas may be improved by introducing a tolerance range to the noise reduction factor.

6. In such a method to detect homogeneous areas or distinguish homogeneous areas from other areas, if the area in question consists of only high frequency signal components, its noise variance may be interpolated from those noise variance values calculated from its neighbouring areas, or output a warning message that for this case no reliable noise variance estimation result is possible.

7. Such a method to detect homogeneous areas or distinguish homogeneous areas from other areas may be applied to different directions, for example both in horizontal and vertical direction, applying the method of 1 not parallel to edge direction, and in case of motion applying the method of 1 not parallel to moving direction.

For the disclosed method, no priori knowledge about the signal in question is required. The disclosed method can also deal with mixed signals, i.e. signals coming from different sources. If the available data are only of high frequency signal components, the disclosed method can give a warning message that the noise variance estimation result can be wrong. The complexity of this disclosed method is not high.

CITED REFERENCES

[Olsen93] Olsen, S. I., "Estimation of noise in images: An Evaluation", CVGIP, Vol. 55, No. 4, July 1993.

[Pratt01] William K. Pratt, "Digital Image Processing", 3rd Edition, ISBN 0-471-37407-5, John Wiley & Sons, Inc., 2001.

[Hent98] C. Hentschel, "Video-Signalverarbeitung", ISBN 3-519-06250-X, B. G. Teubner Stuttgart, 1998.

[Dilly] A. Dilly, etc. "Image noise detection", EP1309185.

REFERENCE SYMBOLS

ClassDAT classification data

CompPDAT comparison data

H transfer function of low pass filter/anti-alias filter

InpS input signal

Is intermediate signal

S signal, signal to be classified

The invention claimed is:

1. Method for classifying a signal, comprising processes of:

(a) providing/receiving a signal (S) to be classified as an input signal (InpS), (b) using said input signal (InpS) or a part or parts thereof as an intermediate signal (IS) or as a respective part or respective parts thereof, (c) decimating said intermediate signal (IS) or a part or parts thereof and thereby generating a processed signal (PS) and using said processed signal (PS) as a new intermediate signal (IS), (d) comparing said new intermediate signal (IS) or a part or parts thereof with said signal (S) to be classified or with a respective part or with respective parts thereof and thereby generating comparison data (CompDAT) as a comparison result, and (e) classifying said signal (S) to be classified or said part or parts thereof based on said comparison data (CompDAT) and thereby generating classification data (ClassDAT) as a classification result, in particular in that given order.

2. Method according to claim 1, wherein said process (c) of decimating said intermediate signal (IS) is based on a multi rate signal processing and/or multi resolution signal processing.

3. Method according to claim 1, wherein said process (c) of decimating said intermediate signal (IS) comprises sub-processes of:

(c1) low pass filtering and/or anti-alias filtering said intermediate signal (IS), and of (c2) down-sampling said intermediate signal (IS), in particular in that given order.

4. Method according to claim 3, wherein the process (c) of decimating said intermediate signal (IS) and in particular the respective sub-processes (c1), (c2) are carried out in order to reduce high frequency components, noise components and/or respective variances thereof and in order to keep the useful signal components of said intermediate signal (IS) essentially unchanged or to reduce said useful components of said intermediate signal (IS) only by a comparable smaller amount or by a comparable small amount, or unchanged.

5. Method according to claim 1, wherein the processes (d) of comparing and/or (e) of classifying are based on a process of gradient estimation, e.g. on a gradient value before and after decimation processing.

6. Method according to claim 3, wherein the process (c) of decimation said intermediate signal (IS) and in particular the respective sub-process (c1) of low pass filtering and/or of anti-alias filtering are based on a windowing process, in particular are based on a Hamming window.

7. Method according to claim 1, wherein the processes (c) of decimating said intermediate signal (IS), (d) of comparing said new intermediate signal (IS), and/or (e) of classifying said signal (S) are carried out to at least one of a next resolution, scale or rate level and/or iteratively, in particular until a certain iteration stop condition is fulfilled.

8. Method according to claim 1, wherein said process (d) of comparing said new intermediate signal (IS) with said signal (S) to be classified involves a comparison of respective noise levels, of levels of high frequency components and/or of respective variances thereof.

9. Method according to claim 7, wherein an iteration—and in particular a respective iteration stop condition—and/or the processes of (d) of comparing said new intermediate signal (IS) with said signal (S) to be classified are based on respective threshold values and/or on respective threshold conditions, in particular in a predefined manner.

10. Method according to claim 1, wherein based on the comparison data (CompDAT) and/or on the classification data (ClassDAT) homogeneous areas or signal components are detected and/or are distinguished from other areas or signal components, in particular with respect to the content of noise and/or of high frequency components.

11. Method according to claim 3, wherein the process (c) of decimating said intermediate signal (IS) and in particular the sub-process (c1) of low pass filtering and/or of anti-alias filtering said intermediate signal (IS) are pre-estimated based on a transfer function (H) given by said low pass filter and/or by said anti-alias filter which is involved.

12. Method according to claim 11, wherein the respective transfer function (H) of the underlying filter is used in order to define at least one of a change factor, a variance range and a variance tolerance range in order to decide whether an area or signal component of said signal (S) to be classified is dominated by high frequency signal components or noise.

13. Method according to claim 12, wherein an area or a signal component is classified as being dominated by noise if a variance calculated from a decimated intermediate signal (IS) is within a variance tolerance range and wherein otherwise the area or signal component in question is classified as being dominated by high frequency signal components.

14. Method according to any claim 1, wherein areas or signal components are detected as being homogenous or are distinguished as being homogeneous from other areas or signal components by a process of cascading.

15. Method according to claim 1, wherein a tolerance range is introduced into a noise reduction factor.

16. Method according to claim 1, wherein, if an area or signal component consists of high frequency signal components only, its noise variance is interpolated from noise variance values which are calculated from areas or signal components in the neighbourhood, and/or wherein in this case a warning message is generated which states that for such a case a reliable noise variance estimation result is not possible.

17. Method according to claim 1, which is applied to a signal of the group which consists of 1-dimensional signals, 2-dimensional signals, 3-dimensional signals, e.g. acoustical signals, speech signals, images, sequences of images.

18. An Apparatus comprising a processor programmed to perform steps comprising:

(a) providing/receiving a signal (S) to be classified as an input signal (InpS), (b) using said input signal (InpS) or a part or parts thereof as an intermediate signal (IS) or as a respective part or respective parts thereof, (c) decimating said intermediate signal (IS) or a part or parts thereof and thereby generating a processed signal (PS) and using said processed signal (PS) as a new intermediate signal (IS), (d) comparing said new intermediate signal (IS) or a part or parts thereof with said signal (S) to be classified or with a respective part or with respective parts thereof and thereby generating comparison data (CompDAT) as a comparison result, and (e) classifying said signal (S) to be classified or said part or parts thereof based on said comparison data (CompDAT) and thereby generating classification data (ClassDAT) as a classification result, in particular in that given order.

19. A computer-readable medium encoded with computer-executable instructions that when executed by a processor perform steps comprising:

(a) providing/receiving a signal (S) to be classified as an input signal (InpS), (b) using said input signal (InpS) or a part or parts thereof as an intermediate signal (IS) or as a respective part or respective parts thereof, (c) decimating said intermediate signal (IS) or a part or parts thereof and thereby generating a processed signal (PS) and using said processed signal (PS) as a new intermediate signal (IS), (d) comparing said new intermediate signal (IS) or a part or parts thereof with said signal (S) to be classified or with a respective part or with respective parts thereof and thereby generating comparison data (CompDAT) as a comparison result, and (e) classifying said signal (S) to be classified or said part or parts thereof based on said comparison data (CompDAT) and thereby generating classification data (ClassDAT) as a classification result, in particular in that given order.

* * * * *